(12) United States Patent
Santander Cerbell

(10) Patent No.: US 6,504,654 B1
(45) Date of Patent: Jan. 7, 2003

(54) MODULATED LIQUID LENS WITHOUT SPHERICAL ABERRATION HAVING MEANS FOR ABSORBING THE SOLAR ENERGY CONDENSER AND PROVIDED WITH A HEAT PLATE FOR THE ABSORPTION OF HIGH TEMPERATURES

(76) Inventor: Roberto Santander Cerbell, Rafael Mesa y López, 63-2° C., Las Palmas de Gran Canaria (ES)

(*) Notice: Subject to any disclaimer, the term of this patent is extended or adjusted under 35 U.S.C. 154(b) by 0 days.

(21) Appl. No.: 09/463,027

(22) PCT Filed: May 13, 1999

(86) PCT No.: PCT/ES99/00136
§ 371 (c)(1),
(2), (4) Date: Jan. 18, 2000

(87) PCT Pub. No.: WO99/60311
PCT Pub. Date: Nov. 25, 1999

(30) Foreign Application Priority Data

May 18, 1998 (ES) ............................................. 9801025
Sep. 15, 1998 (ES) ............................................. 9801931

(51) Int. Cl.⁷ .............................. G02B 1/06; G02B 3/08
(52) U.S. Cl. ........................................ 359/665; 359/741
(58) Field of Search ................................. 359/665, 741, 359/796, 619–620

(56) References Cited

U.S. PATENT DOCUMENTS 3,600,063 A * 8/1971 Bowen ...................... 359/626
5,760,871 A * 6/1998 Kosoburd et al. .......... 351/161
5,774,273 A * 6/1998 Bornhorst ................... 359/665

* cited by examiner

Primary Examiner—Jordan M. Schwartz

(57) ABSTRACT

Liquid modular lens, without sphencal deviation, provided with means to absorb the solar energy condenser, supplied with a thermal plate capable of absorbing high temperatures, consisting of a liquid modular lens consisting of lenticular circular crowns, with a precise and adequate refraction index, making possible the convergence of the luminous front captured by the lens towards a single focus, having blunt ends in the lenticular crowns, it being possible to modify the exit angle of every luminous ray in the lenticular crowns, and keeping a proper separation to prevent breakages caused by dilatations, all the constituent pieces of the lens being sealed in their internal and external perimeters, thermal plate consisting of a body made of a ceramic material of great thermal resistance provided internally with a cavity.

11 Claims, 5 Drawing Sheets

MODULATED LIQUID LENS WITHOUT SPHERICAL ABERRATION HAVING MEANS FOR ABSORBING THE SOLAR ENERGY CONDENSER AND PROVIDED WITH A HEAT PLATE FOR THE ABSORPTION OF HIGH TEMPERATURES

DESCRIPTION

This descriptive report refers to a liquid modular lens, without spherical deviation, provided with the means to absorb the solar energy condenser, supplied with thermal plate for absorption of high temperatures, whose purpose is to present lenticular receptacles, where the tapering ends of the lenticular receptacles have been eliminated or compensated, being configured as circular crowns that were generated by the spherical deviation of the lenses, created by the tapering ends, presenting, at the same time a variation in the refraction index in each circular crown, by using different fluids provided with an appropriate index of refraction, consequently determining the suitable uniform convergence of the solar flow, in order to let the solar flow be transformed into a light bundle of parallel rays, using the divergent liquid lens placed next to the luminous focus.

This invention also contemplates the possibility of modifying the exit angle of the lenticular receptacles, changing the slope of the lower face of the liquid modular lens.

It is a further object of the invention that the lenticular receptacles which form the liquid modular lens without spherical deviation, are placed and adapted on a reticular structure, which confers on it the appropriate form, keeping a suitable separation between them, in order to allow the dilations that may be produced, avoiding the accumulation of dirt in the spaces between the lenticular receptacles, using, to prevent this anomaly, the sealing of the whole internal and external perimeters of the used receptacles.

It must also be mentioned that the invention presents the particularity that, after sealing the whole liquid modular lens, the resultant chambers are also filled in their turn with a fluid whose aim is to avoid internal reflection between both masses of glass.

Finally, the invention contemplates the use of a thermal plate to absorb the high temperatures produced by a solar energy condenser, the purpose of which is to receive the solar energy collected by the liquid modular lenses or solar collectors which, duly concentrated by an absorption system, allow the fluid that circulates inside the thermal plate to absorb, by means of pertinent reception, the duly transformed solar energy.

FIELD OF THE INVENTION

This invention has its field of application within the industry dedicated to the manufacturing of elements, apparatuses, and devices for the use and transformation of solar energy.

BACKGROUND OF THE INVENTION

The Invention Patents filed in Spain under numbers 9601033 and 9700507 define the configuration and characteristics of liquid modular lenses (L.L.M.), configured as lenses for condensing solar energy, being configured from a set of lenticular receptacles placed in successive circular crowns, whose whole constitutes a spherical segment.

The above mentioned disposition of the liquid modular lens thus constituted brings important advantages in the manufacturing of large lenticular solar collectors, especially in their costs, thickness, weight, transport, installations and similar circumstances.

This antecedent, as well as its configuration, can be observed in FIG. 1.

In accordance with the foregoing, it has been confirmed that the object protected by the above-mentioned patents has a much lower level of spherical deviation, that is to say, deviation of the light out of the focus, although it should be mentioned that the appropriate system, device, or element used to absorb the solar energy condenser (C.E.S.), based on the liquid modular lens, needs a perfect luminous convergence in order to let the luminous cone of the liquid modular lens be converted into a powerful bundle of parallel light rays, having a minimum leakage of energy and maximum concentration.

To achieve the best luminous convergence of the liquid modular lens, the spherical deviation that hinders the concentration of the light that comes through the lens into the focus must be completely eliminated, the deviation being greater the further it is from the optical axis as shown in FIG. 2, incorporated as an illustration of the quoted antecedents, and for that purpose some modifications have been made, by means of which it has been possible to eliminate the problem of spherical deviation and consequent leakage of energy.

Concerning the thermal plate for the absorption of high temperatures, the applicant knows of the existence of an Invention Patent, filed in Spain under number 9801025, where the characteristics of an absorption system are defined and claimed, the object of which is to transform the luminous cone of the liquid modular lens into a powerful light bundle of parallel rays, with the minimum leakage of energy and a maximum concentration, capable of producing high temperatures.

Among other utilities and applications, the high temperature obtained from the conversion of the luminous cone of the lens by means of the absorption system makes possible several chemical processes for which it is absolutely necessary and, in particular, the pyrolysis of water, that is to say, dissociation of the water molecule in oxygen and hydrogen at temperatures higher than 2000° C.

To reconduct the high temperature obtained from the collection of the solar energy by the liquid modular lens or solar collectors, properly concentrated by the absorption system, and in order to conduct the temperature by an absorption fluid, it would be necessary to have a thermal plate that, provided with an internal channelling along which a fluid can circulate, makes that fluid receive the energy by absorption.

Nevertheless, apart from the patents already mentioned, the applicant has neither notice of the existence of a liquid modular lens without spherical deviation, provided with means to absorb the condenser of solar energy, nor notice of a thermal plate which, properly applied in collaboration with the liquid modular lens, allows the channelling of the circulation of fluids, making possible the absorption of the high temperature generated by a condenser of solar energy.

DESCRIPTION OF THE INVENTION

The liquid modular lens without spherical deviation, provided with means to absorb the solar energy condenser, supplied with a thermal plate capable of absorbing high temperatures, constitutes itself a clear originality within its specific field of application, since it presents in its context a number of specific characteristics which, in association with the improvements made in known elements of practically similar application, make possible the configuration of the liquid modular lens here claimed, as a liquid modular lens without spherical deviation, provided with means to absorb the condenser of solar energy which, being supplied with a thermal plate to absorb the high temperatures generated by a condenser of solar energy, allows the high temperature to be received by a fluid that circulates inside an internally hollow plate, and through which, due to a conduction existing in it, the circulating fluid receives the logical heat of the high temperature obtained and conducted towards the plate.

Specifically, the liquid modular lens without spherical deviation, provided with means to absorb the condenser of solar energy, with thermal plate capable of absorbing high temperatures that is the object of this invention, is made up of some lenticular receptacles that adopt a specific form or configuration, where the tapering ends of each of the lenticular receptacles of the circular crowns have been eliminated or compensated, these being the origin of an important part that generates the spherical deviation of the lenses.

The variation in the refraction index in each circular crown, decreasing towards the ends of the liquid modular lens, obtained by using several fluids with an appropriate index of refraction, determines the uniform and suitable convergence of solar flow, so that it can be transformed into a light bundle of parallel rays, by means of a divergent liquid lens placed near the luminous focus.

The invention requires the possibility, if necessary, of modifying the exit angle of the lenticular receptacles by changing the slope of the lower face of the liquid modular lens.

The lenticular receptacles which form the liquid modular lens without deviation, are placed and fitted on a reticular structure, which provides it with the proper form among them, in order to allow the possible stretching that may arise, avoiding the accumulation of dirt in the spaces between the lenticular receptacles, using the sealing of the whole internal and external perimeters of these receptacles.

It must also be mentioned that, once the liquid modular lens has been sealed, the resultant chambers are also filled in their turn with a fluid the aim of which is to avoid internal reflection between both masses of glass.

Concerning the thermal plate for absorbing high temperatures, it should be mentioned that, it consists of a body made of materials suitable to be subjected to temperatures between 2000° C. and 3000° C., having a chamber where the steam is dissociated with the proper porosity to allow the transition of the oxygen and hydrogen atoms dissociated in the shortest possible time.

The thermal plate is made of a high-temperature ceramic material considered as the best material to fulfil not only the resistance to high temperature but also the proper porosity.

The oxygen and hydrogen should be displaced instantaneously in opposite directions, that is to say, each of them towards opposite ends of the thermal plate, this displacement being made when the water-molecule is dissociated in order to avoid its reaction, for which purpose the thermal plate is provided laterally with a powerful electrostatic field which harnesses the ionisation of the oxygen and hydrogen atoms when they are dissociated, drawing the oxygen towards the positive pole and the hydrogen towards the negative pole in order, after passing through the thermal plate walls, to proceed with the cooling and later storage of both elements by means of the evacuation channels installed for this purpose.

With this aim, the thermal plate has two lateral cavities, one in each end, to receive the oxygen and hydrogen separately, once they have passed through the porous walls of the thermal plate.

DESCRIPTION OF THE DRAWINGS

In order to complement the description which is being given, and to assist in the obtaining of a better understanding of the characteristics of the invention, this descriptive report is accompanied, as a integral part of the same, by a set of drawings, which with an illustrative and non-limiting character, show the following.

PREFERENTIAL FULFILMENT OF THE INVENTION

Figure 1:
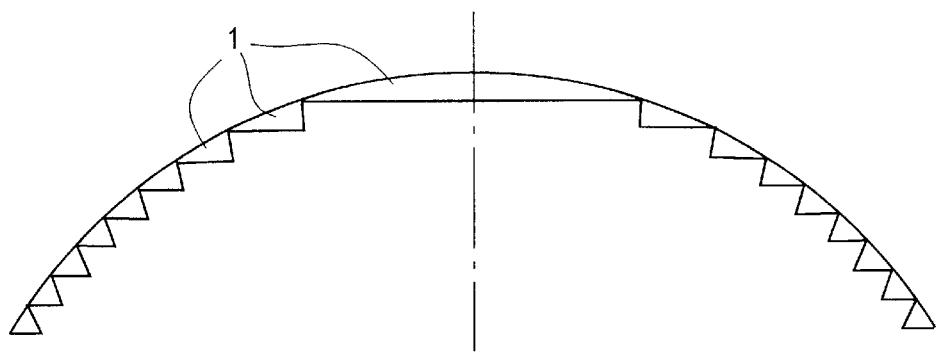
FIG. 1.—Shows the configuration and characteristics of a liquid modular lens for condensing solar energy consisting of a set of lenticular receptacles, placed in successive circular crowns, whose whole constitutes a spherical shell, used in the invention patents mentioned as precedents.
Figure 2:
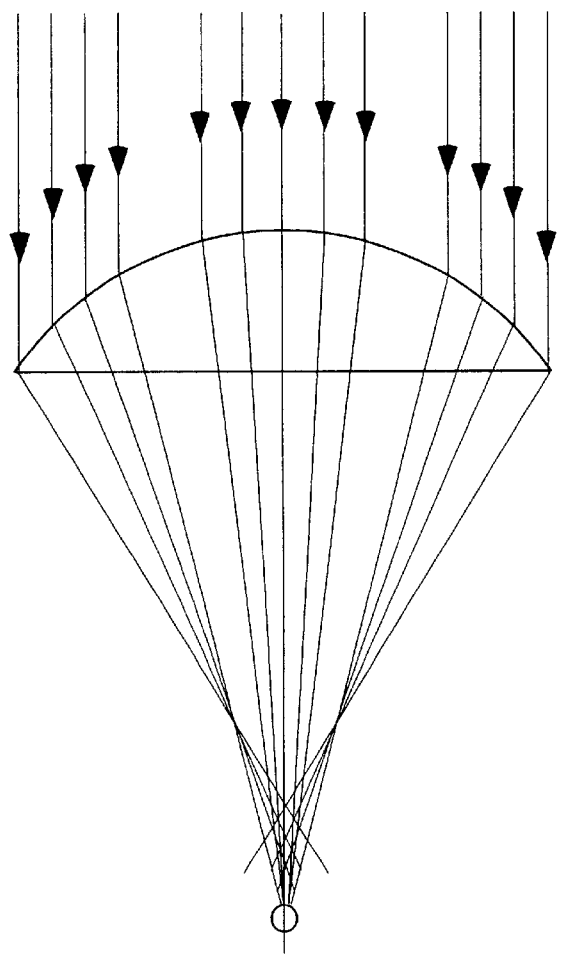
FIG. 2.—Shows the graphic representation of the details, relating to the luminous convergence of liquid modular lens, concerning which the existence has been verified of several problems constituting a spherical deviation which prevents the focus collecting the light that passes through the lens, as has been mentioned in this specification, specifically when talking about the background to it.
Figure 3:
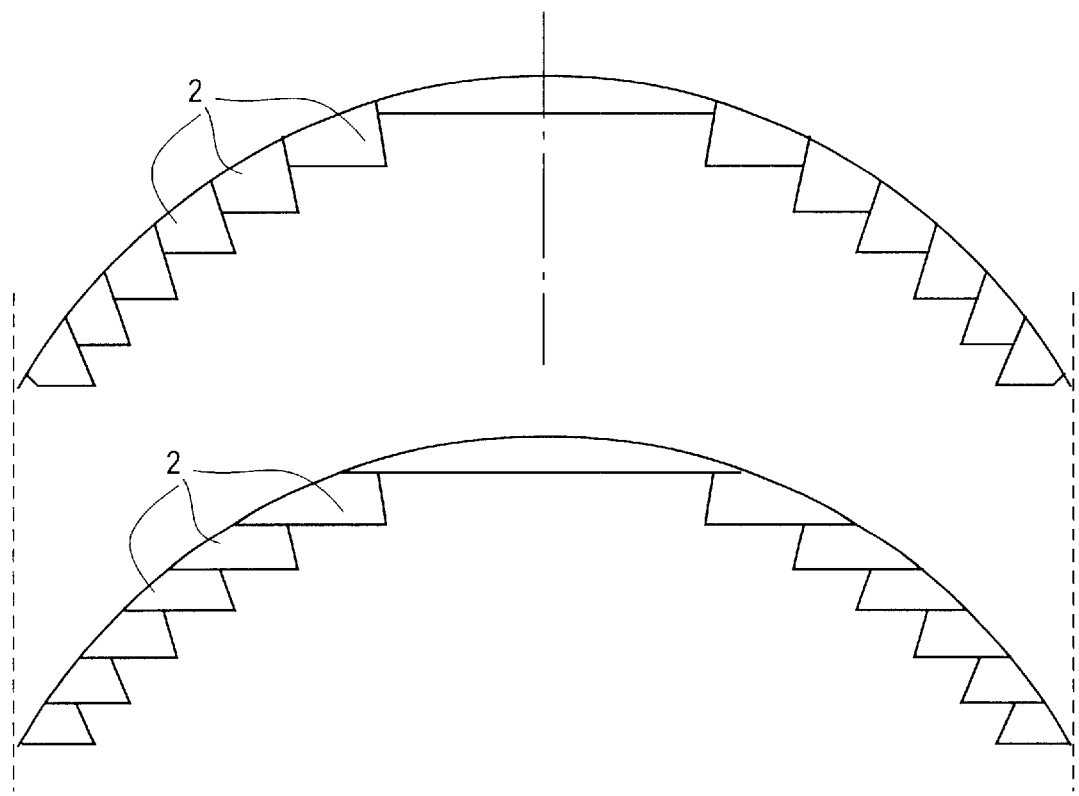
FIG. 3.—Is a schematic view of the object of this invention, relating to a modular liquid lens without spherical deviation provided with a means to absorb the of solar energy condenser with thermal plate capable of absorbing high temperatures, where, as shown in this figure, the tapering ends of the lenticular receptacles, constituting the circular crowns and partial originator of the spherical deviation in the lenses, have been eliminated or compensated.

In FIGS. 3, 4, 5, 6 and 7, it can be observed how the claimed liquid modular lens, without spherical deviation, provided with a means to absorb the solar energy condenser, supplied with a thermal plate capable of absorbing high temperatures, consists of lenticular receptacles (2), of which the tapering ends of each lenticular receptacles (2) of the circular crown, created from them, have been eliminated or compensated, partially preventing, as a consequence, the spherical deviation of the lenses, as shown in FIG. 3.

In accordance with the variation of the refraction index in each circular crown, decreasing toward the ends of the liquid modular lens, obtained by using several fluids, an appropriate index of refraction is achieved, and they determine the uniform and suitable convergence of the solar fluid with the intention of transforming the solar fluid into a light bundle of parallel rays, using the liquid divergent lens, placed next to the luminous focus.

Figure 4:
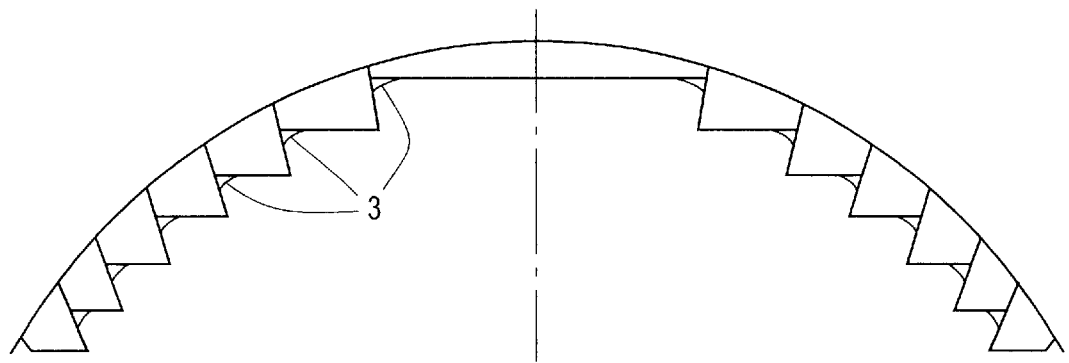
FIG. 4.—Shows in a simplified way, the possibility of modifying the exit angle of the lenticular receptacles, changing the slope of the inferior face.

The invention contemplates the possibility of modifying the exit angle of the lenticular receptacles (2), changing the slope lower face (3) of the liquid modular lens as shown in FIG. 4.

The lenticular receptacles (2), which form the liquid modular lens are placed and adapted on a reticular structure, which confers on it the appropriate form, keeping the suitable separation between them, in order to allow the dilations that can be produced, preventing dirt from accumulating in the spaces between the lenticular receptacles, using, to prevent this accumulation, a sealing stage around all the internal and external perimeters of the said receptacles, and once the liquid modular lens has been properly sealed, the resultant chambers are filled in their turn with a fluid whose aim is to avoid internal reflection between both masses of glass.

The invention presents a divergent liquid lens (4), placed at the proper distance from the luminous focus, and whose objective is to achieve an adequate beam of light by the movement of the divergent liquid lens (4), together with a prism (5), following the luminous focus of the modular liquid lens.

Figure 6:
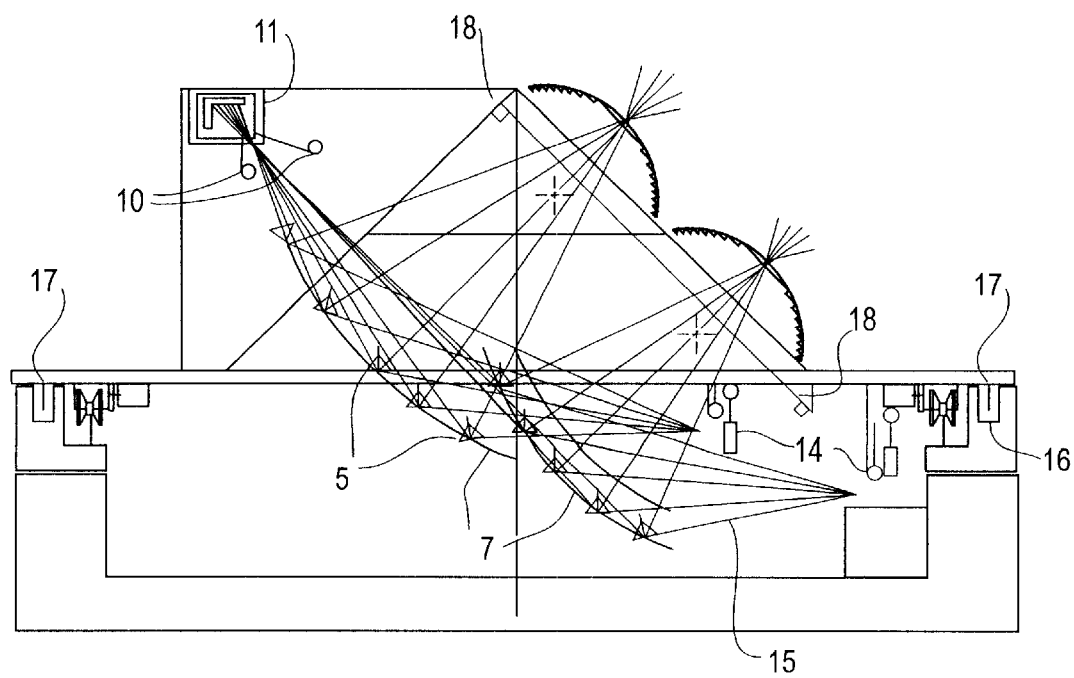
FIG. 6.—Is a simplified view to show how the liquid prism receives the light bundle from the divergent liquid lens and how it is diverted towards the absorbent, keeping the luminous focus in a static position in the absorbent's window.

The invention also contemplates, the use of a liquid prism which receives the beam of light from the divergent liquid lens (4) and diverts it towards the absorbent, keeping the luminous focus in a static position in the absorbent's window, as shown in FIG. 6.

Figure 5:
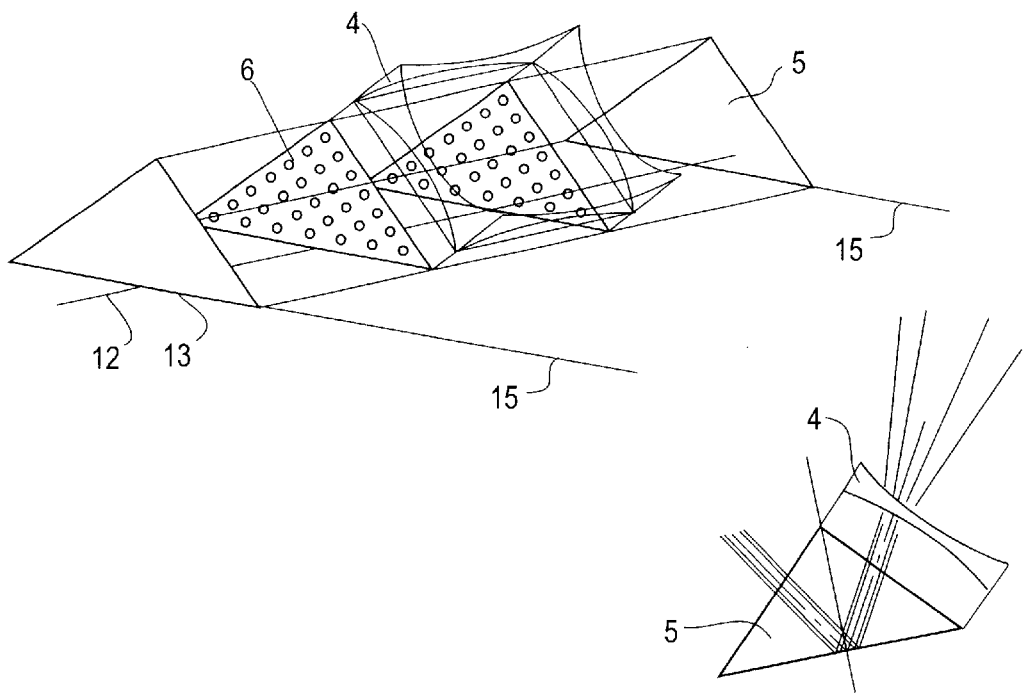
FIG. 5.—Is a representation of the way the liquid prism has lateral perforated walls to generate or to allow the circulation of the fluid it is composed of, in order to cool it.

FIG. 5, shows how the lateral faces (6) of the liquid prism (5) can be provided with perforations in order to let the fluid of which it is composed circulate, achieving proper cooling.

The invention has a guide rail, holder of the divergent liquid lens and liquid prism, making it possible, thanks to the holder guide rail (7), to displace the divergent liquid lens (4) and liquid prism (5), keeping at the same time an equal distance between the liquid modular lens and the divergent liquid lens (4), as well as the liquid prism (5).

Figure 7:
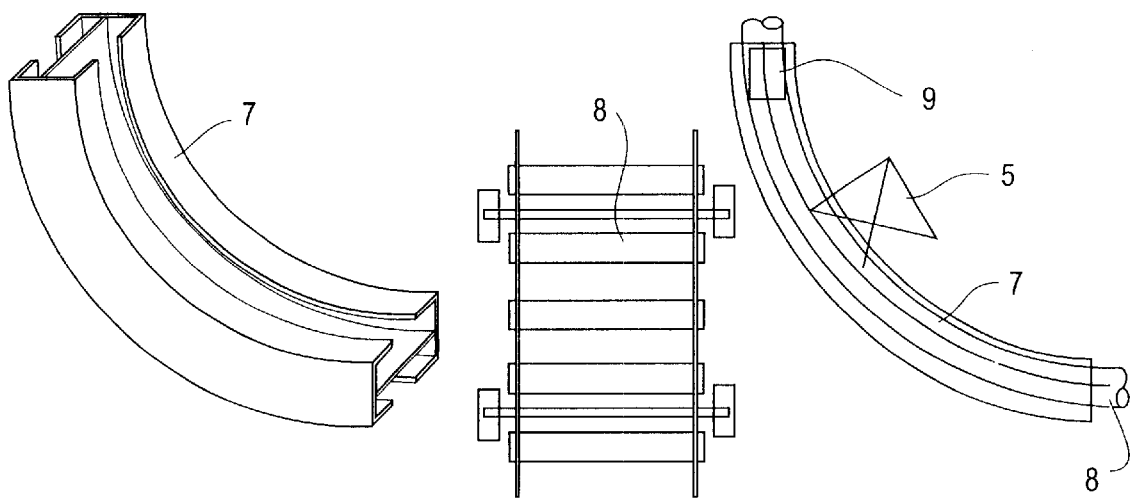
FIG. 7.—Is another simplified view of the means used to follow the focus of the liquid modular lens, which is backed on to a rail in collaboration with a motor.

The set consisting of the divergent liquid lens (4) and the liquid prism (5), shown in FIG. 5, is joined to a chain or rack (8) that allows its ascendant or descendent movement by the action of a motor (9) backed on to the holder guide rail (7) and controlled by sensors (10) installed in the absorbent window (11) in such a way that any displacement of the luminous focus in the absorbent window (11), out of its centred position, will generate the activation of the motor (9) placed on the holder guide rail (7), which will move the set formed by the prism (5) and the divergent lens (4) following the luminous focus of the liquid modular lens, as shown in FIGS. 6 and 7.

In order to keep the beam of light always centred on the absorbent's window (11) and to achieve the displacement of the prism following the light bundle coming from the divergent lens (4), the above mentioned liquid prism (5) turns around its transverse axis (12), depending at all times of day on the sun's height.

The rotation of the liquid prism (5) around its transverse axis (2) to keep the beam of light centred on the absorbent's window (11) has the peculiarity of the base (13) of the mentioned liquid prism (5) remaining unfailingly oriented throughout its track towards a fixed point (14) and, as a consequence of that, if the base (13) of the liquid prism (5) remains oriented to the above mentioned fixed point (14) by means of the action of a stretcher, the liquid prism (5) will turn by itself, achieving the necessary and sufficient angle to keep the light bundle on the desired centred position, as shown in FIG. 6.

The invention has a solar energy condenser which must always be hermetically sealed and insulated from any external agent, in order to avoid the action of the external atmospheric agents which can obstruct the transparency of the elements made of glass, inside the solar energy condenser, and to avoid possible anomalies, the solar energy condenser includes on the upper side of the fixed structure a circular channel (16) filled with fluid, into which is introduced a flap integral with the movable structure in the manner of a bracket (17) which prevents the entrance of the external atmosphere, as shown in FIG. 6.

To prevent the uncontrolled action of the focus of the liquid modular lens, the invention presents in its installation and, specifically in the internal area under the liquid modular lens, an extensible darkener (18), manufactured in a suitable material, the purpose of which is to prevent the passage of light when it is not required, in order to prevent damage to the internal elements of the solar energy condenser, the extensible darkener (18) being controlled by automatic opening and closing sensors.

Figure 8:
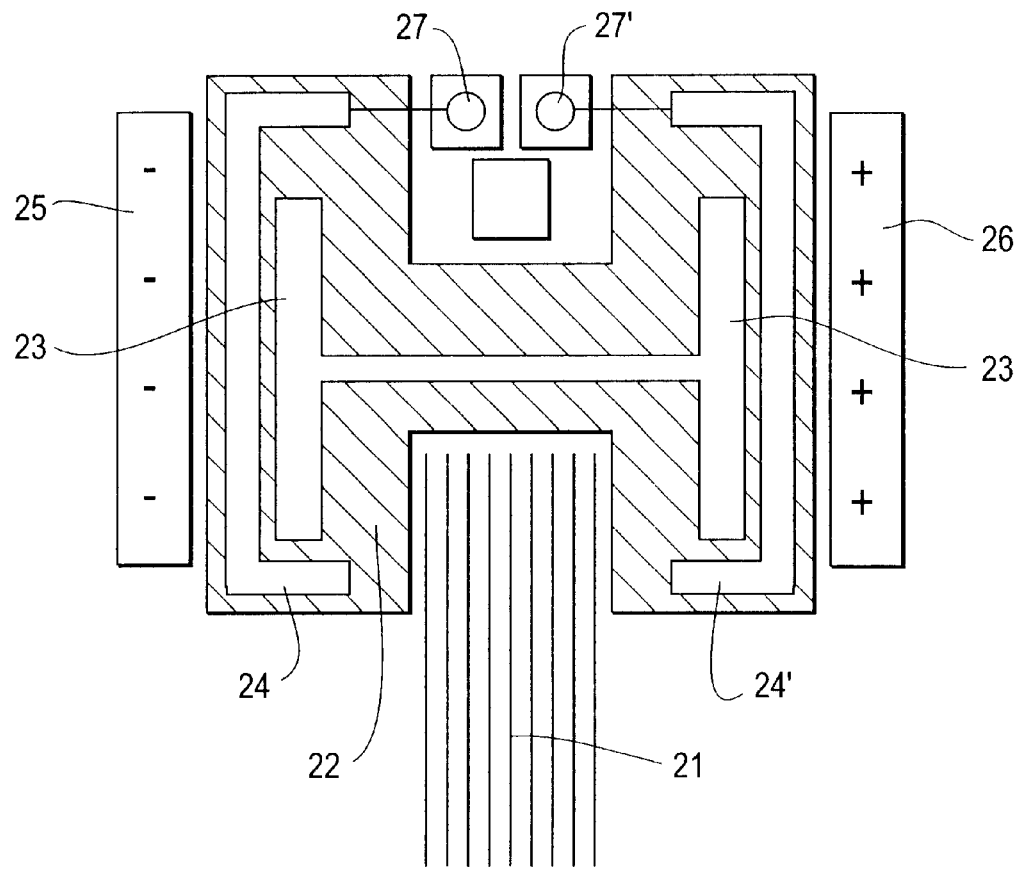
FIG. 8.—Finally shows a plan and sectional view of the thermal plate for absorbing high temperatures.
Figure 8:
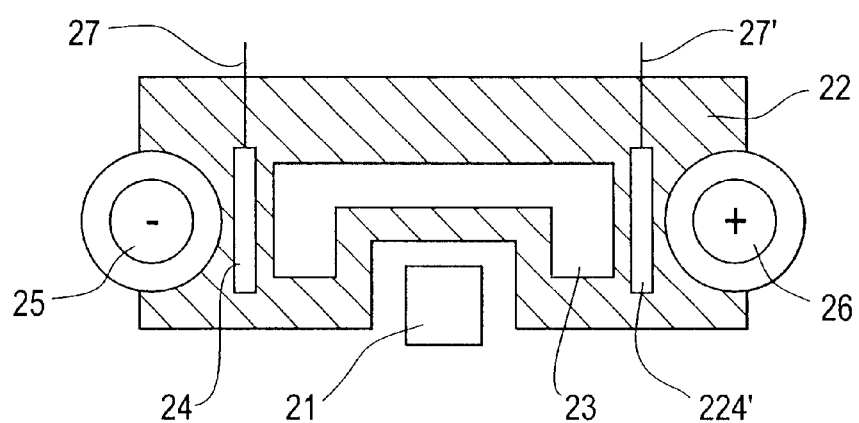

Following FIG. 8, it can be seen that the thermal plate for absorbing high temperatures consists of a body (22) made of a ceramic material of high thermal resistance, which also acts as a semi-permeable membrane, since it has the proper porosity to let the oxygen and hydrogen atoms pass quickly, presenting at least three differentiated areas, configured as a central cavity (23) where the steam is dissociated and two lateral cavities (24) and (24') to collect the hydrogen and oxygen separately, being provided laterally with a negative electrostatic field (25) and a positive electrostatic field (26), able to displace the hydrogen atoms instantaneously towards the negative pole (25) and the oxygen atoms towards the positive pole (26), forcing the atoms to pass through the walls of the body (22) to be placed in the lateral cavities (24) and (24'), from which they are extracted through the conduits (27) and (27') located respectively in connection with cavities (24) and (24') to proceed to their cooling and later separately storage.

As has already been said, the thermal plate body is subjected to high temperatures of between 2000° and 3000°, the temperature being received due to a set of lenticular receptacles (21) placed in successive crowns around a central lens, aligned to the external spherical surface, the thermal plate (22) being provided with a chamber (23), where the steam is dissociated, the material used for the thermal plate requiring to have the proper porosity to permit the dissociated oxygen and hydrogen atoms pass, in a substantially reduced period of time, using a high temperature ceramic as a suitable material to configure the body of the thermal plate (22) provided with appropriate porosity.

The oxygen and hydrogen must be displaced instantaneously in opposite directions, specifically when the water-molecule is dissociated, in order to prevent them reacting, for which purpose the thermal plate (22) is provided with two electrostatic fields (25) and (26) negative and positive respectively, which harness the ionisation of the oxygen and hydrogen atoms when the water is dissociated, drawing the oxygen towards the positive pole (26) and the hydrogen towards the negative pole (25), in order later, after passing through the thermal plate (22) walls, to proceed with the cooling and later storage of both elements by means of the evacuation channels (27) and (27'), connected to the cavities or hollow areas (24) and (24') placed laterally to receive the oxygen and hydrogen separately, once these elements have passed through the porous walls of the thermal plate (22).

What is claimed is:

1. An optical system comprising a liquid modular lens without spherical deviation, said liquid modular lens to condense solar energy, the optical system further comprising means to absorb the solar energy condensed, said absorbing means comprising a thermal plate capable of absorbing high temperatures, wherein said liquid modular lens consists of a number of lenticular receptacles (2), without tapered ends, forming the lenticular receptacles (2) are a number of circular crowns, the lenticular receptacles being filled with different fluids, provided with a refraction index determining the uniform convergence of the solar flow, said solar flow being further transformed into a light bundle of parallel rays, by a divergent liquid lens (4), placed next to the luminous focus, the exit angle of the lenticular receptacles (2) being modifiable by changing the slope of the lower face (3) of the liquid modular lens, the lenticular receptacles (2) of the liquid modular lens placed and fitted on a reticular structure, and all of the lenticular receptacles (2) having between them an adequate separation, to allow dilations, all of the lenticular receptacles (2) being sealed in their internal and external perimeters, and the chambers created by that seal also being filled with a fluid the purpose of which is to prevent internal reflection, incorporated between the receptacles perimeters and the chambers.

2. The optical system of claim 1 wherein the divergent liquid lens (4) obtains the appropriate light bundle by means of its displacement together with a liquid prism (5) following the luminous focus of the liquid modular lens, created by the lenticular receptacles (2) hermetically sealed.

3. The optical system of claim 2, wherein the liquid prism (5) receives the light bundle from the divergent liquid lens (4), diverting it towards an absorbent for absorbing the solar energy condensed and keeping the luminous focus in a static position in an absorbent's window (11), the lateral walls (6) of the liquid prism (5) having optional perforations, through which the fluid of which it is composed circulates to cool it.

4. The optical system of claim 1, wherein a set formed by the divergent liquid lens (4) and a liquid prism (5) moves along a holder guide rail (7), keeping an equal distance between the liquid modular lens, the divergent liquid lens (4) and the liquid prism (5).

5. The optical system of claim 1, wherein a set formed by the divergent liquid lens (4) and a liquid prism (5) is joined to a chain or rack (8) being displaced in an ascendant or descendant movement by the action of a motor (9) backed onto the holder guide rail (7) itself, controlled by sensors (10) installed in the absorbent's window (11), controlling any movement of the luminous focus on the absorbent window (11), out of its centered position, by the activation of the motor (9) placed above the guide rail (7), moving the set formed by the liquid prism (5) and the divergent lens (4) to follow the luminous focus of the liquid modular lens.

6. The optical system of claim 1, wherein, in order to orientate a liquid prism (5) and to keep the light bundle always centered on a window of an absorbent for absorbing the solar energy condensed (11), independently of the movement of the liquid prism (5) following the light bundle coming from the divergent lens (4), the above mentioned liquid prism (5) makes a variable turn around its transverse axis (12), depending on the sun's height at any time of day.

7. The optical system of claim 6, wherein the rotation of the liquid prism (5) around its transverse axis (12), keeping the light bundle centered on the window of the absorbent (11), is made by means of a stretcher (15) fixed to the base (13) of the above mentioned liquid prism (5), oriented to a fixed point (14) generating the automatic rotation of the liquid prism (5) and obtaining the required angle for the light bundle to remain in the required centered position.

8. The optical system of claim 1, wherein the solar energy condenser, configured as a hermetically closed and insulated whole, is located in the upper part of a fixed structure, and specifically within a circular channel (16), filled with a fluid, provided inside with a flap integral with the movable structure in the manner of a bracket (17).

9. The optical system of claim 8, wherein, in the lower part of the liquid modular lens focus, there is a darkener (18), made of an extensible structure and of a material capable of preventing the passage of light, being controlled by automatic opening and closing sensors.

10. The optical system of claim 1, wherein, to absorb high temperatures generated by a solar energy condenser provided with a liquid modular lens (21), consisting of a number of lenticular receptacles in successive crowns around a central lens, aligned with the external spherical surface, a thermal plate (22) consists of a body made of a high temperature ceramic material, provided with porosity, the body (22) of the thermal plate acting as a semipermeable membrane which lets the oxygen and hydrogen atoms pass instantaneously when the water-molecule is dissociated inside a chamber (23) the molecules passing through the porous ceramic of high-thermal-resistance body towards a negative electrostatic field (25) and a positive electrostatic field (26) located collaterally, instantaneously displacing the hydrogen atoms of the negative field (25) towards a cavity (24) and the oxygen atoms of the positive field (26) to a cavity (24').

11. The optical system of claim 10, wherein the cavities (24) and (24') in which the hydrogen and oxygen atoms respectively are stored, have evacuation channels (27) and (27').

* * * * *